June 8, 1965 W. H. BLASHFIELD 3,188,395

AUTOMATIC TELEPHONE SYSTEM

Original Filed Aug. 13, 1957 5 Sheets-Sheet 1

INVENTOR.
WILLIAM H. BLASHFIELD

BY Brown, Jackson, Boettcher & Dienner

June 8, 1965 W. H. BLASHFIELD 3,188,395

AUTOMATIC TELEPHONE SYSTEM

Original Filed Aug. 13, 1957 5 Sheets-Sheet 2

INVENTOR.
WILLIAM H. BLASHFIELD

BY Brown Jackson Boettcher & Dienner

INVENTOR.
WILLIAM H. BLASHFIELD
BY Brown, Jackson, Boettcher & Dienner

June 8, 1965 W. H. BLASHFIELD 3,188,395

AUTOMATIC TELEPHONE SYSTEM

Original Filed Aug. 13, 1957

5 Sheets-Sheet 4

INVENTOR.
WILLIAM H. BLASHFIELD

BY Brown, Jackson, Boettcher & Dienner

June 8, 1965 W. H. BLASHFIELD 3,188,395
AUTOMATIC TELEPHONE SYSTEM
Original Filed Aug. 13, 1957
5 Sheets-Sheet 5
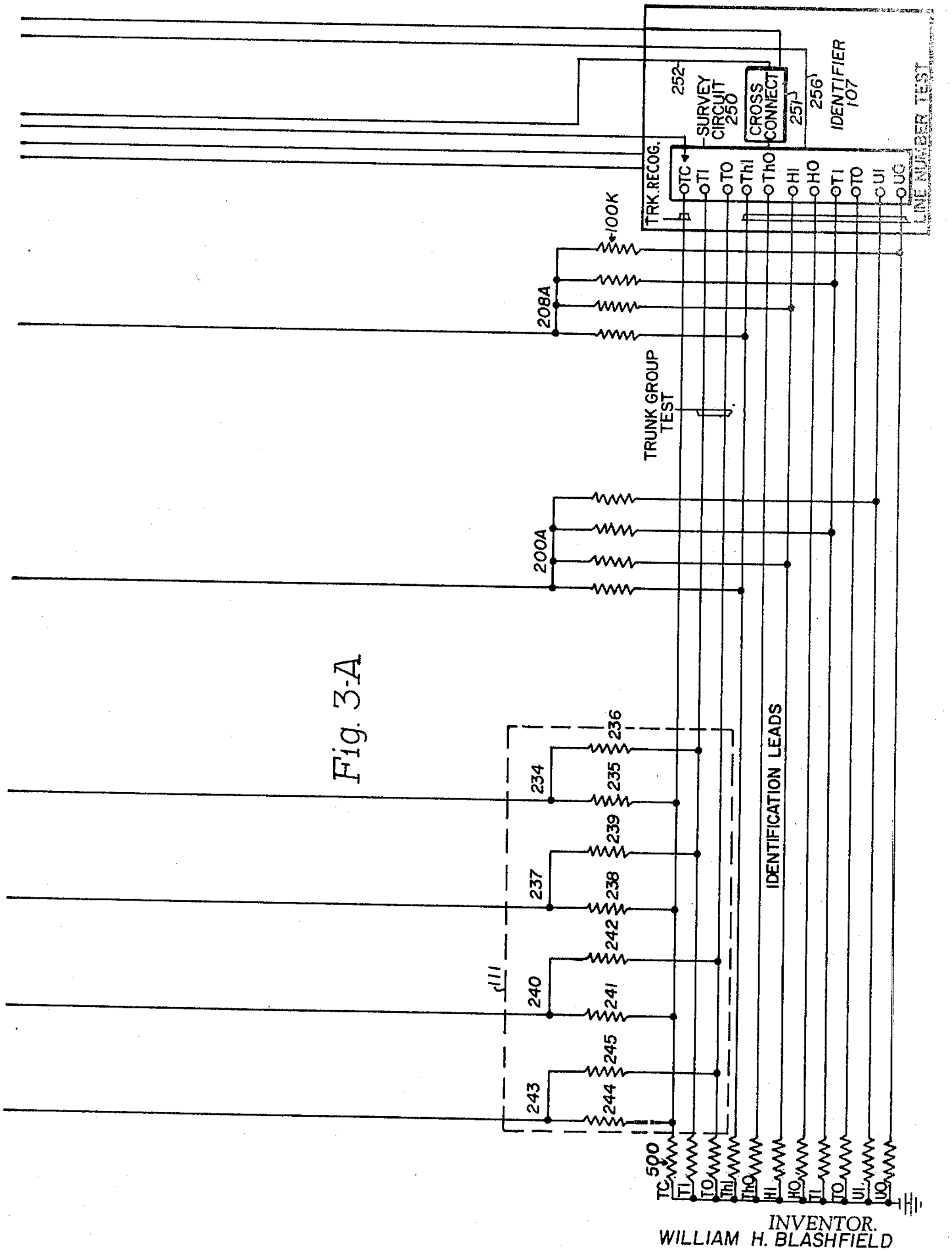
Fig. 3-A
INVENTOR.
WILLIAM H. BLASHFIELD
BY Brown Jackson Boettcher & Dienner United States Patent Office 3,188,395

Patented June 8, 1965

3,188,395
AUTOMATIC TELEPHONE SYSTEM

William H. Blashfield, Galion, Ohio, assignor to North Electric Company, Galion, Ohio, a corporation of Ohio Continuation of application Ser. No. 677,953, Aug. 13, 1957. This application July 24, 1962, Ser. No. 214,782
22 Claims. (Cl. 179—17)

Figure 1:
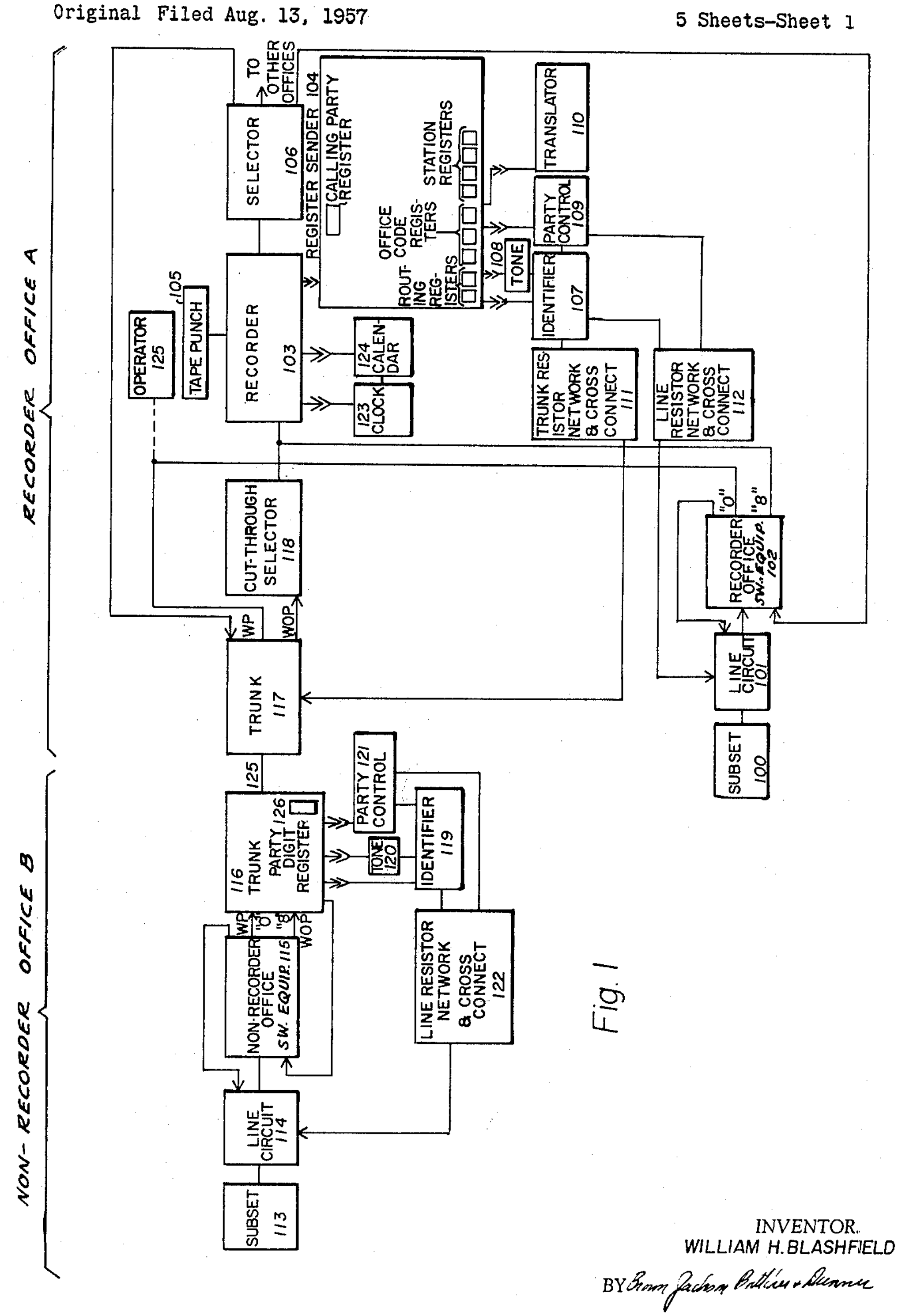

This application is a continuation of my previously filed copending application, Serial No. 677,953, which was filed August 13, 1957, now abandoned, and the benefit of the filing date of the copending application, Serial No. 677,953, is claimed for this application.

The present invention relates in general to automatic telephone systems having toll ticketing equipment and in particular to a novel line identification arrangement for use with automatic toll ticketing equipment.

The constant demand for expansion and improvement of telephone service in recent years has resulted in the increased use of the so-called automatic toll ticketing equipment which is adapted to place the extension of a connection to local and distant subscribers under the direct control of the calling subscriber, and which responsively and automatically provides a ticket or record of the complete data concerning each call of such type which is established over the exchange.

Although toll ticketing equipment offers many obvious and practical advantages, the incorporation of many of the known types of toll ticketing apparatus in existing automatic and manual exchanges is considered extremely impractical by reason of the high cost of the equipment required for such installation. As a result, much of the equipment is limited in its use to long haul, high density areas such as are common to metropolitan districts.

One toll ticketing system which has proven quite flexible in its application is taught in the copending application to Blashfield et al. which was filed July 23, 1951, and issued as Patent No. 2,782,257, and which was assigned to the assignee of this invention. In such arrangement, initial cost and upkeep is at least partially minimized by providing equipment wherein the subscriber identifies himself by dialing his own directory number for identification purposes prior to the dialing of the directory number of the desired subscriber. Manifestly, such type system permits the elimination of a large amount of expensive automatic identifier units and renders feasible the inclusion of automatic toll ticketing equipment in smaller exchanges which may have low volume, low rate traffic conditions. It is apparent, however, that in certain installations, as for example, business installations wherein the calling subscriber makes a large number of daily interexchange calls, the dialing of the calling subscriber's number prior to the dialing of the called subscriber number becomes time consuming and burdensome. It is a particular object of the present invention therefore to provide a system which incorporates the features and advantages of such system, and which is additionally operative to provide a record of the data concerning each call responsive to the dialing of a single digit by the calling subscriber.

It is a further object of this invention to provide a system having these features which is comparatively economical in cost and which is readily included in existing exchanges with the addition of a minimum amount of conversion equipment.

A feature of the present invention is the manner in which the arrangement provides identification for the different parties in exchanges connected according to a terminal per station or a terminal per line pattern with equal facility, the identification in each instance being accomplished merely by dialing a single digit.

A further feature of the invention is the novel manner in which a series of simple resistance networks connected between the subscriber lines (or trunks) and a set of marking conductors are used to mark the identity of the calling subscriber thereon, and the manner in which the identifier unit quickly scans the conductors for the purpose of ascertaining the identity of the calling party as marked thereon, and supplies such information to the recorder equipment. Suitable means for guarding against fraud may be included in the arrangement to guard against the erroneous allocation of a toll ticketing charge to the wrong party, as more fully taught in the above-identified copending application.

Figure 2:
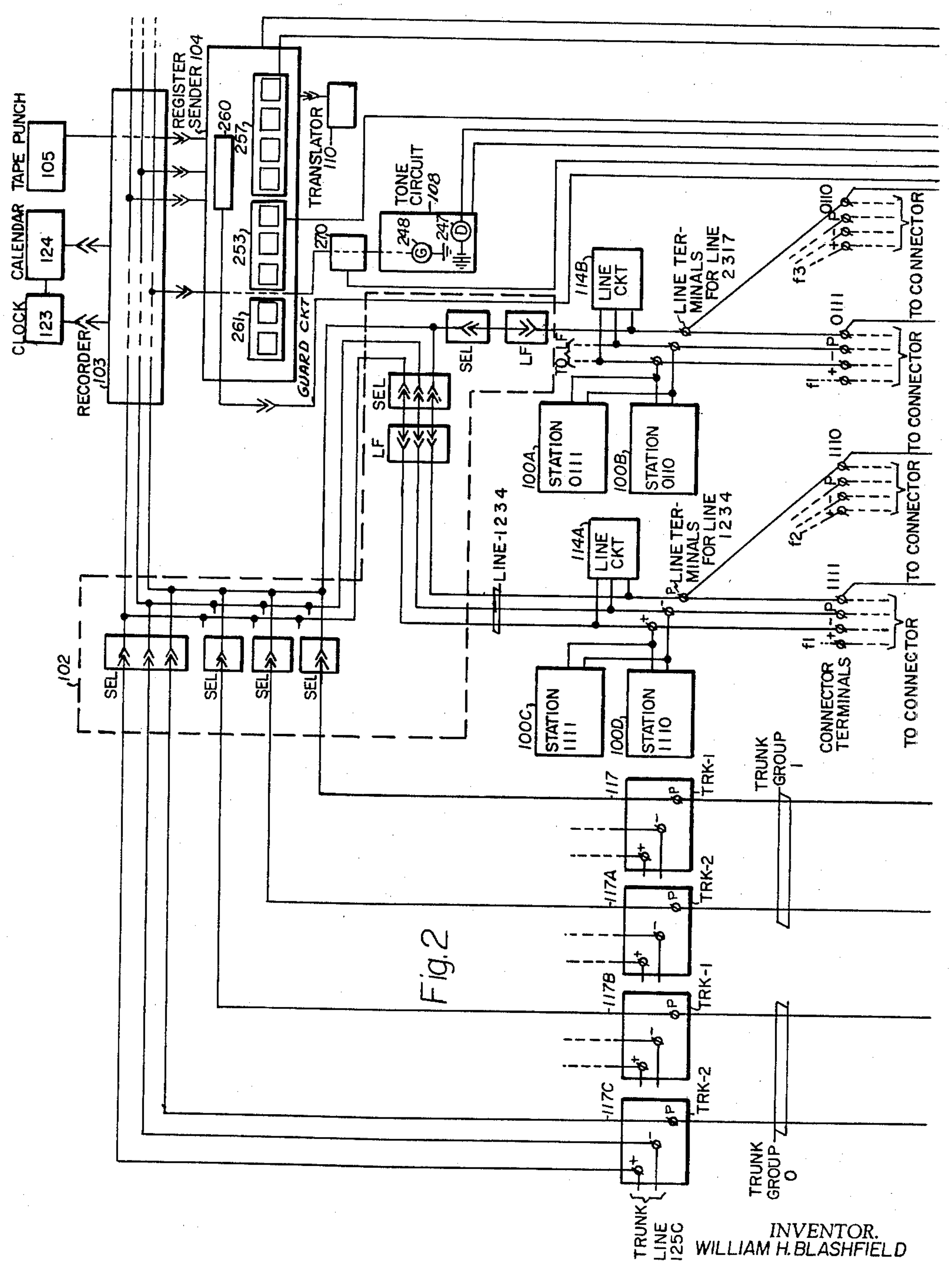
Figure 2A:
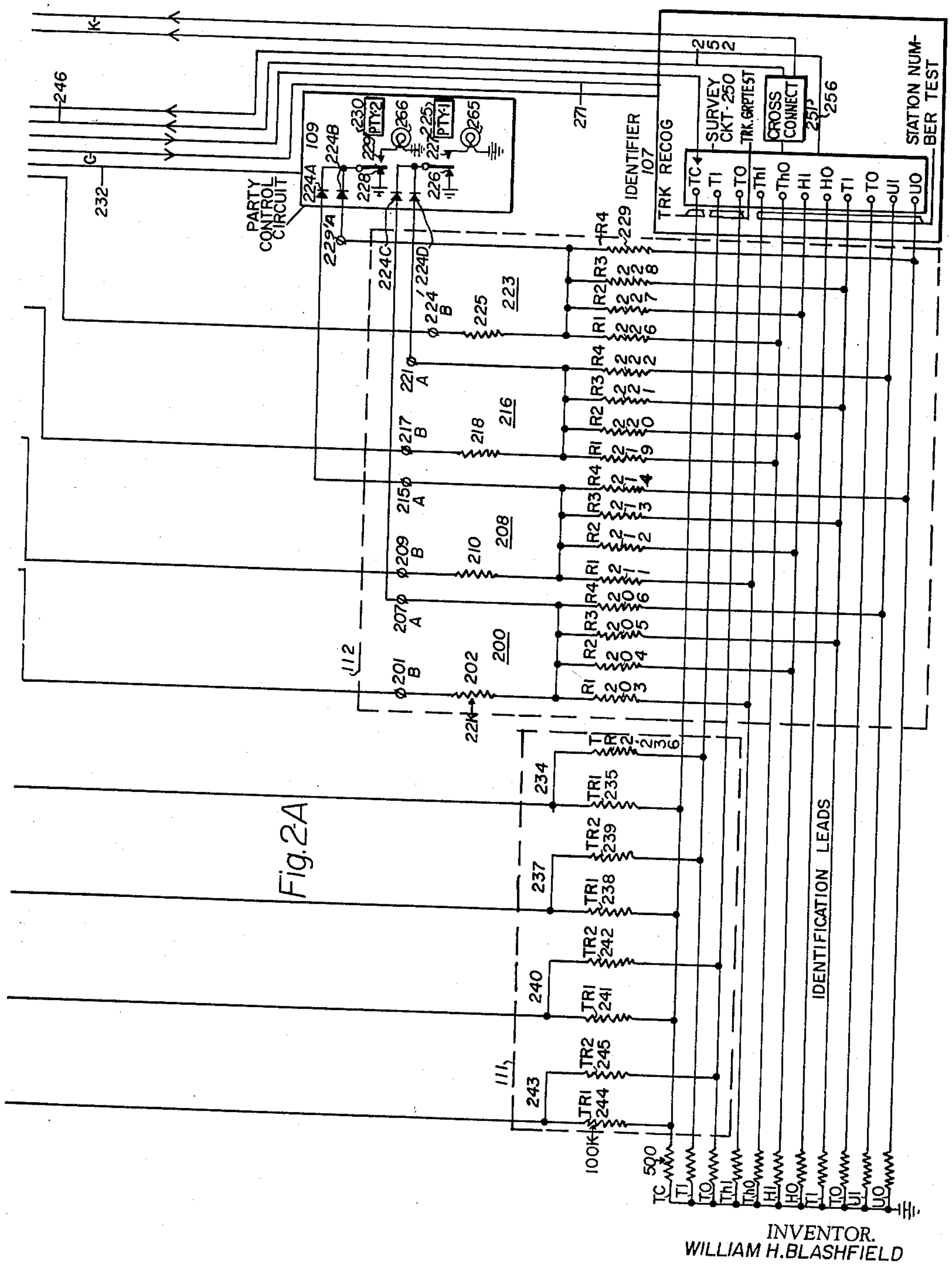
Figure 3:
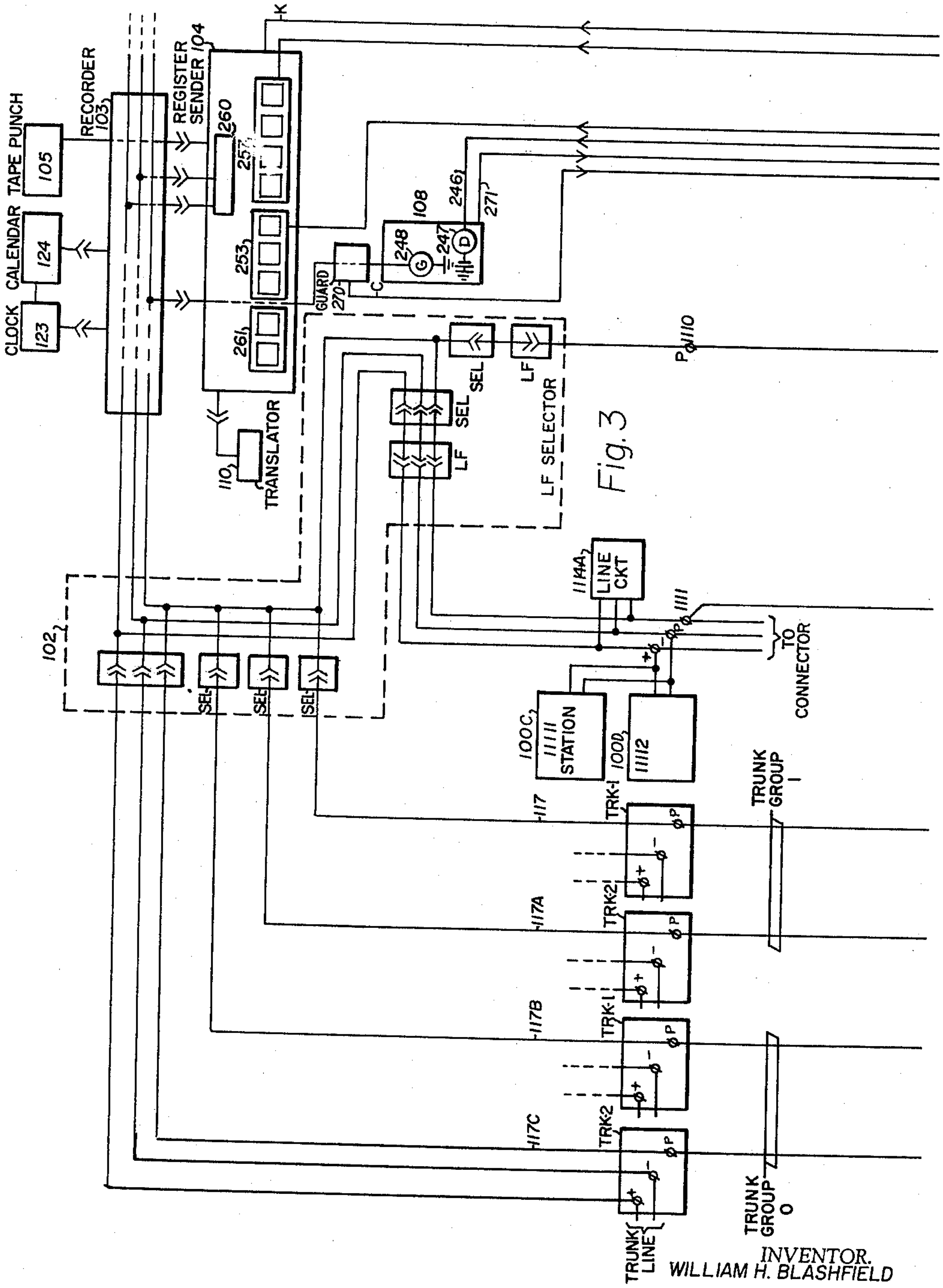

Other features and advantages of the novel toll ticketing system will be apparent with consideration and reference to the following specification and drawings, in which:

FIGURE 1 illustrates in block form a telephone system of a known type in the field including the novel line identification equipment;

FIGURES 2 and 2A illustrate the specific connection of the identification equipment in an exchange of the type shown in FIGURE 1, wherein the subscribers are connected on a terminal-per-station basis; and FIGURES 3 and 3A illustrate the specific connection of the identification equipment in an exchange of the type shown in FIGURE 1, wherein the subscribers are connected on a terminal-per-line basis.

GENERAL DESCRIPTION

A. *Call from recorder office to non-recorder office*

The novel line identification arrangement of the invention may be included in many known types of exchanges, and for purposes of illustration, such arrangement has been set forth in FIGURE 1 of the drawings in its manner of inclusion in an existing installation at Sandpoint, Idaho.

For purposes of simplicity, the drawing of the telephone system is limited to a disclosure of the switching equipment in a recorder office A and a non-recorder office B, and such portions thereof which are concerned with the line identification operation. A brief consideration at this time of the manner in which a call is established from the recorder office A to the non-recorder office B will best serve to generally identify the exchange switching components including the novel line identification equipment, and the manner of operation thereof with such components in the establishment and recording of an interexchange call.

Briefly, as a subscriber, such as the illustrated subscriber having substation 100 removes his receiver from the hook switch associated therewith, a connection is extended over an associated line circuit 101 to conventional switching equipment 102 in the recorder office A. In order to make a toll ticketed call the calling subscriber dials the following information in the following order:

(1) A toll ticketing access digit(s) which routes the call into toll ticketing equipment. For example, we shall use digit "8" in the following description.

(2) The calling party digit for the purpose of identifying to the toll ticketing equipment from which party on the line the call originated.

(3) The 2–5 (i.e. seven digit) called telephone number. The first three digits of this number indicate the called office and will be called the office code and the last four digits will be called the station number.

As the subscriber first dials the toll ticketing access digit 8, the switching equipment 102 in the recorder office A routes the call over the switches therein to an idle one of a group of recorders, such as illustrated recorder 103, which in turn seizes a register sender, such as illustrated register sender 104.

As the calling subscriber now dials the assigned subscriber's party digit, such digit is transmitted over the connections to the seized register sender 104 which responsively stores same in the party register for identification purposes as hereinafter described.

The calling subscriber next dials the seven digit called subscriber station number over the established connection to the recorder, and the recorder responsively effects operation of an associated tape punch unit 105 for the purpose of making a record of such digits thereon, and additionally transmits such digits to the seized register-senders 104. With the receipt of the first four digits, register-sender 104 seizes a common translator 110 for use in extending the connection to the desired exchange. The translator 110 deletes any unnecessary digits which are stored in the register-sender 104, inserts any necessary routing digits therein, and then restores.

The sender portion of register-sender 104 next transmits digits found in the registers (with the exception of the last digit of the called subscriber directory number), clearing each digit register after that digit has been sent in preparation for re-use for storing the calling number as described hereinafter. The routing digits are extended over selector 106 which is tied to recorder 103 and over trunk 117–125–116 to the switching equipment 115 in the non-recorder office to control same in the establishment of a connection in the direction of the desired subscriber.

Thereupon the register-sender 104 seizes the common identifier circuit 107, the party control circuit 109, and tone circuit 108, which have access over the identifier networks 111, 112, in the recorder office to the trunk and subscriber line circuits thereof. As identifier circuit 107 recognizes the call as having originated at recorder office A, the identifier stores the calling office code in the office code digit register of the register-sender 104, and thereafter scans the line resistor and cross connect network 112 for the first digit of the calling station number.

With the determination of the value of the first digit of the calling station number (which is accomplished in a manner to be described more fully hereafter), the digit is registered in the register-sender 104 which operates responsively thereto to transmit the remaining digit of the called number over the established connection to the switching equipment in the remote exchange to control same in the further extension of the connection. Simultaneously the identifier 107 proceeds to complete identification of the calling station number and to store such number in the register-sender 104. With the completion of the transmission of the called number, recorder 103 causes the tape member to be advanced a predetermined number of steps for spacing purposes.

With the transmission of the last digit of the called number, the register-sender 104 transmits the calling office and calling station identification digits via recorder 103 to the tape punch 105 to effect recording of such information thereon. Register-sender 104 now restores.

At this time the switching equipment 115 in the non-recorder office B has effected the extension of the call over the line circuit 114 to substation 113 of the desired subscriber, and ringing signals are applied thereto. As the called subscriber answers, a signal indicating such response is transmitted over the established connection to the recorder 103 to cause same to seize a common clock 123 and common calendar 124. Calendar 124 transmits pules to the tape punch 105 via recorder 103 indicating the month, day, hour and tenth of an hour at which the call was answered. Calendar 124 also transmits the first minute punch to be recorded on the tape and then restores. As the conversation proceeds, clock 123 transmits fractional minute impulses to the recorder 103 which counts the pulses, and sends minute pulses to the tape punch 105 to control same to record on the tape member the number of minutes of duration of the conversation.

If the called subscriber hangs up first, recorder 103 terminates transmission of minute pulses to the tape punch 105, and as the calling subscriber replaces the handset, the connection is released. If the calling subscriber restores first, the connection is released immediately.

B. *Call from non-recorder office to recorder office*

The manner of establishing a connection from a subscriber in a non-recorder office B to a recorder office A will be described briefly hereat.

As the calling subscriber removes his handset from the substation 113, the connection is extended over associated line circuit 114 to the switching equipment 115 in the non-recorder office in the conventional manner. As the subscriber now dials the toll ticketing access code 8, the switching equipment 115 routes the connection over an idle trunk, such as illustrated trunk 116 in the non-recorder office, and an associated trunk 117 in the recorder office. Additionally digit 8 selected the trunk over a path without pulse "WOP" which marked the trunk 116 to advance the call to the distant trunk circuit 117 without "dual function" pulse, whereupon the trunk circuit 117 routes the call through a cut-through selector 118 in the recorder office to an idle one of the recorders, such as illustrated recorder 103. The seized one of the recorders 103, in turn, responsively seizes a register-sender 104. Parenthetically, if the calling subscriber in office B had reached the trunk by dialing "0" instead of "8," the trunk would have been reached over a path with pulse "WP" such that the trunk circuit 116 would have sent a "dual function" pulse over the trunk line 125 to the trunk circuit 117 in the recorder office; and the trunk 117 in response thereto would have routed the call to the operator.

The calling subscriber's party digit as dialed by the calling subscriber, is transmitted over the established connections and stored in the calling party register in the recorder office register-sender 104. Also, this digit is stored in party register 126 in trunk 116 if the calling office B is terminal per station.

The subscriber then dials the called seven digit number, the impulses of which are transmitted over the existing connection to recorder 103 in the recorder office which in turn controls tape punch 105 to make a record thereof, and simultaneously stores each digit in the seized register-sender 104. In response to the storage of the first four digits therein, register-sender 104 seizes the common translator 110.

Translator 110 deletes any unnecessary digits stored in the register sender 104, supplies any necessary routing digits to the registers thereof, and restores. The sender equipment in the register-sender 104 transmits the digits found in the registers (with the exception of the digit in the last register) to selector 106 which is tied to recorder 103 to thereby extend the connection in the direction of the desired subscriber. At this time register-sender 104 seizes the common identifier 107, party control circuit 109 and tone circuit 108.

Identifier 107 operates in the manner more fully described hereinafter for the purpose of determining whether the connection is incoming over a trunk group, and in such event, the particular trunk group over which the call originated. Identifier 107 effects such examination via trunk resistor network and cross connect 111, and upon determining the trunk group involved, transmits such information for storage in the office code registers in the register-sender 104. The identifier 107 thereupon additionally transmits a signal over register-sender 104, recorder 103, cut-through selector 118 and trunk circuit 117 to trunk circuit 116 requesting same to engage the identifier 119, tone circuit 120, and party control circuit 121 in the non-recorder office. The identifier 119 is similar to that of FIGURE 2 and the principle of identification used is the same as that already described.

Identifier 119, examines line resistor network and cross connect circuit 122 for the digits of the calling station number and transmits the information thus obtained in impulse form over trunk 116–125–117 and selector 118, recorder 103 to register-sender 104.

With the registration of the first of these digits in the register-sender 104, the remaining digit of the called number is transmitted by the register-sender 104 in the direction of the desired subscriber for the purpose of controlling the equipment at the recorder-office to complete the connection to the desired subscriber. When the calling number has been completely transmitted, identifier 119, tone circuit 120 and party control circuit 121 in the non-recorder office restore.

After the last digit of the called number is transmitted, the register-sender 104 in the recorder office transmits the calling office and calling station identification digits over the recorder 103 to the tape punch 105 for recording purposes and then restores. Switching equipment 102 at the recorder office A effects application of ring signals to the called subscriber line in the conventional manner. The operation of the calendar and clock equipment thereafter is similar to that set forth in the call previously described.

As the subscribers complete their conversation and restore their handsets, the equipment used in the holding of the connection is restored in the manner heretofore described.

As noted above, in an exchange in which the subscriber lines are connected according to a terminal per station pattern, the party digit dialed by the calling subscriber is stored in the trunk register 126 in the non-recorder office. Such storage is necessary in that the different subscribers on the line have different directory numbers and the party digit thus stored provides the necessary identification to the local identifier equipment, such as identifier 119, resistor network 122 etc., as to which one of the particular one of the subscriber directory numbers associated with such line is to be transmitted to the recorder office.

In an exchange in which the subscriber lines are connected according to a terminal per line pattern, however, the line number to be transmitted by the identifier 119 etc. to the recorder office is the same for each party on the calling line, and accordingly the party digit which was stored in the register-sender 104 as dialed, is the same as the last digit of the directory number, and accordingly may be relayed by the sender to the tape punch.

The difference in such systems is more fully described hereinafter, and the operation of the equipment in the different types of exchange will become more apparent therefrom.

It is also noted that the foregoing descriptions are concerned with the extension of a call by a subscriber from a non-recorder office to a recorder office, and from a recorder office to a non-recorder office. In the extension of a call from a non-recorder office over a recorder office to any other office, the operation of the switching equipment is similar to that described in the matter of the extension of a call from a non-recorder office to a recorder office. The register-sender, such as illustrated register-sender 104, in such event however provides appropriate digits for the purpose of routing the call through the one of the exchanges which includes the desired subscriber.

SPECIFIC DESCRIPTION

As noted hereinbefore, the invention is specifically concerned with a novel arrangement in which the calling party identifies himself for toll ticketing purposes by dialing a single digit (identified as the party digit hereinafter). For exemplary purposes, the novel line identification equipment is shown, in its connection and operation, in a system of the general type illustrated in FIGURE 1. The showing in FIGURE 2 illustrates the operation thereof in a system which is connected on the terminal-per-station basis, and the showing in FIGURE 3 illustrates the connection and operation thereof in a system which is connected on the terminal-per-line basis.

The connection of an exchange according to these two patterns is well known in the art and accordingly only a brief resume of such arrangements is given hereat. It is well known, for example, that an automatic telephone system basically consists of a series of automatic switches which are operative in response to the dialing of a directory number by a calling subscriber to extend a connection to a set of terminals which has the desired subscriber connected thereto, such terminal sets being conventionally located in an exchange connector switch. The manner in which the desired subscriber on the line is signaled as the call is extended to the desired terminal set will vary in accordance with the particular pattern of connection of the subscriber lines to such terminals.

More specifically, in a terminal per line arrangement each line in the exchange is connected to one terminal set in the connector switch which is assigned thereto, and the switching equipment reaches each of the subscriber substations on such line over the assigned terminal. Since each of the stations is accessed over a common terminal set, it is apparent that each of the stations connected to such line must have as a portion of its directory number, the number assigned to such terminal set. In such arrangement, the directory number for each subscriber will include in addition to the common portion, an extra digit which is designated as the "ring digit," and the ring digit distinguishes between the parties on the line for ringing purposes. That is, a first party will be assigned digit 1, a second party on the line will be assigned digit 2, etc., and a different ringing frequency is applied to the line which is consistent with the ringing digit of the desired subscriber.

In exchanges in which the subscriber lines are connected on the terminal-per-station basis, each subscriber substation in the exchange has an individual final terminal set in the connector switches, and each subscriber substation is therefore assigned the directory number of the individual terminal set to which it is connected. In an exchange in which the subscribers are connected according to such pattern, a party line (one which has a number of subscribers connected thereto) will necessarily be connected to each of the different terminal sets which are provided for each of the different substations which are to be connected to the party line. Obviously, in such type exchange the directory numbers of the various parties do not necessarily have common digits representative of line terminals, and by reason of the different directory numbers for the different subscribers on a party line, a "ring" digit is not required for signalling purposes as in terminal-per-line type exchanges, ringing frequencies for the various parties being determined by arbitrary cross-connect.

Manifestly, the manner of ascertaining the calling subscriber will be different in a terminal-per-station and a terminal-per-line arrangement, and the following description is concerned with the two different types of connections which are provided for the alternative patterns.

TERMINAL PER STATION IDENTIFICATION

With reference to FIGURE 2, there is shown therein the manner in which subsets such as 100A, 100B, 100C and 100D are connected in an exchange of the type shown in FIGURE 1 which is connected according to the terminal-per-station pattern.

In such showing, a plurality of lines including party line 1234 having stations 1110 and 1111; and party line 2317 having stations 0111 and 0110 are illustrated in their connections to the recorder office switching equipment 102. Each subscriber line is connected via an associated line circuit to conventional links in switching equipment 102 and also to a set of connector terminals such as 1111, 1110, 0111, 0110 etc. Additionally, each line is connected over a line identification network, such as 200, 208, etc., in the line resistor network and cross connect 112 to the line identification equipment including identifier 107, tone circuit 108 and party control circuit 109 respectively.

In a similar manner incoming trunks, such as 117, 117A, 117B and 117C at the recorder office are shown in their connection between the incoming trunk lines 125, 125A, 125B, and 125C and the links of switching equipment 102 in the recorder office. Each trunk is also connected over an associated trunk resistor network and cross connect 111 to the identifier 107.

More specifically, as noted above, the identification numerals 1234 for a party line in the terminal-per-station arrangement are used to designate the entrance or originating call terminals of the line, whereas 1111 and 1110 of the stations on the line are used to designate the called or connector terminals of the two stations on party line 1234. Obviously in such arrangement the P-wire terminal 1234 is cross connected by intermediate distributing frame jumpers to P-wire terminals 1111 and 1110. The party line 2317 having stations 0111 and 0110 connected thereto has its originating P-wire terminal cross-connected in a similar manner to the connector P-wire terminals associated with the two stations 0111 and 0110. The P-wire terminals of the party lines 1234 and 2317 are connected in conventional manner to associated line circuits such as 114A and 114B over which access is gained to conventional links in the switching equipment 102.

According to the invention, the P-wire terminals of each of the stations on a party line are also permanently connected to the input "B" terminal of an associated resistor identification network, each station having its own individual network for identification purposes. As shown in FIGURE 2, the P-wire terminal for station 1111 is connected to the input "B" terminal 201 of the identification marking means 200 which is individual to such station; the P-wire terminal for station 1110 is connected to input terminal 209 for identification network 208; the P-wire terminal for station 0111 is connected to the input terminal 217 for identification network 216, and the P-wire terminal for station 0110 is connected to the input terminal 224′ for identification network 233. A control "A" terminal such as 207, 215, 221, 229′, for each of the networks 200, 208, 216, 223, etc., are cross connected through the party control circuit 109 over individual rectifiers such as 224A–224D, to lever contacts 226, 227; 228, 229 of the first and second party relays, such as 225, 230, the operation of which will be described more fully hereinafter.

The party control circuit 109 is connected over conductor 232 to the register sender 104, and is controlled in its operation by signals received over such connection from the register sender, the nature of the signal being determined by the value of the calling party digit which was dialed into the register sender 104 by the calling party for identification purposes.

Each identification marking means, such as 200, comprises in addition to the input and control terminals 201, 207, a resistor 202 (in the present embodiment 22K) connected between the input and control terminals 201, 207, and additionally to a resistor network comprised of a plurality of resistor identification elements 203–206, each of which is in the order of 100K in the present embodiment. The output side of the resistors 203–206 in the network are connected to a common marking means which includes a plurality of identification leads TH1–TH0, H1–H0, T1–T0, U0–U1, which in turn are connected to the identifier circuit 107. More specifically, each resistor of a network is connected to an individual one of the identification leads which corresponds to an assigned one of the digits of the station number for its associated station. Thus for station 1111 the first resistor 203 will be connected to the first thousands identification lead TH1; the second resistor 204 will be connected to the first hundreds identification lead H1; the third resistor 205 will be connected to the first tens identification lead T1; and the fourth resistor 206 will be connected to the first units identification lead U1. The manner of connection of the remaining networks in the exchange to such leads will be obvious therefrom.

The identification arrangement additionally includes a similar set of identification marking leads TC, T1–T0, upon which a trunk in use identifies itself in coded fashion for detection by the identifier circuit 107. More particularly, with reference to the trunk 117, it will be apparent that the P-wire terminal of said trunk is connected to an associated link of the exchange switching equipment 102 in the conventional manner as more fully indicated in the block diagram of FIGURE 1. The P-wire terminal of said trunk is also permanently connected to an associated resistor identification network, such as 234, which includes a pair of resistors 235 and 236. One of the resistors, such as resistor 235, of said trunk network is connected to a trunk common lead TC, and the other one of the resistors of said trunk network is connected to the one of the ten identification leads T1–T0 which corresponds to its trunk group. The connections of the individual resistor identification networks 237, 240, 243, for trunks 117B, C, D, respectively, will be obvious therefrom. It should be observed that trunks 117 and 117A belong to a trunk group "1"; and that trunks 117B and 117C belong to a trunk group "0."

It is apparent from the foregoing description that the resistance networks, such as 234 for the trunks, and the resistor networks, such as 200, for the subscriber lines are connected to provide indications to the trunk marking leads TC–T0, and the line marking leads TH1–U0, respectively, whenever their associated equipment is in use.

The trunk marking leads TC–T0 and the subscriber line marking leads TH1–U0 are, in turn, each connected over an individual 500 ohm resistor to negative battery, and, as shown in the right-hand portion of FIGURE 2, are terminated in individual terminals in the identifier circuit 107.

The identifier 107 basically comprises survey circuit 250 including a scanning or finder switch which as operated is enabled to scan over the terminals for the purpose of ascertaining the particular marking leads which have been energized by the identification network associated with the calling subscriber. To this end, the scanning switch (which may be of the all relay or mechanical type) is connected over cable 246 to a tone detector circuit 247 in the tone circuit 108. As will be more fully disclosed hereinafter, the tone circuit 108 also includes a tone generator 248 which is operative during the identification procedure to apply tone over the P-wire circuit which has been established in the connection, which circuit includes the calling line or trunk P-wire terminal, the particular one of the resistor networks, such as 200 or 234, associated with the call, and the identification leads marked by such network to the identifier 107 and tone circuit 108. As the survey means is operated in the identification of a line to advance over each of the identification leads, the detector circuit 247 is connected by the survey circuit to each of the identification leads for the purpose of determining the particular ones of the leads which have been marked, and the survey circuit 250 and tone detector circuit 247 in such operation provide a common detector means for the identification leads in the system.

According to a feature of the invention more fully described hereinafter, the identifier 107 first surveys the common trunk terminal TC to determine if the call originated from a trunk. If such identification is present the identifier searches the trunk identification leads T1–T0 for the identity of the trunk group. If trunk identification is not found on the TC lead, the survey circuit skips the trunk terminals, marks the call as one of local origin, and surveys the subscriber line identification leads TH1–U0 to determine the identification of the calling station.

If the survey circuit 250 determines that the call originated over a trunk group, signals which identify such trunk group (i.e., the calling office code) are transmitted over cross connect network 251 and cable 252 to the office registers 253 in the register-sender 104, which store the three-digit calling office code transmitted thereto. As noted heretofore the identity of the calling subscriber in the remote exchange is later extended over the trunk group to the register sender.

If the survey circuit 250 determines that the call was originated by a local subscriber, the survey circuit 250 identifies the call as originating in the local office by transmitting the three-digit local office code over cross connect network 251 and cable 252 to the three digit office register 253 of the register-sender 104. The survey circuit also transmits signals which identify the calling station over cable 256 to the station registers 257 in the register-sender 104.

CALL FROM SUBSCRIBER IN RECORDER OFFICE TO SUBSCRIBER IN NON-RECORDER OFFICE

The manner in which a call is established from the station 1111 on party line 1234 to a subscriber in a non-recorder office B, such as the subscriber having the illustrated subset 113, and the manner in which the calling subscriber is identified to the toll ticketing apparatus in the recorder exchange, is now set forth. As the calling subscriber at station 1111 lifts his receiver from the subset thereat, the call is extended over line circuit 114A and the line 1234 to an idle link in the switching equipment 102 in the recorder office A. For purposes of a simplified disclosure only the +, −, and P-wires of line 1234 are illustrated in the connection to the switching equipment.

The calling subscriber now dials the toll access digit 8, and the party digit assigned for identification purposes followed by the seven digit called number which is comprised of three office code digits followed by four station digits.

As the toll ticketing access code "8" is transmitted to the seized selector of switching equipment 102, the selector operates to extend the calling connection to an idle recorder on level 8 which is shown connected in direct multiple to all of the first selectors in the exchange switching equipment 102. It will be understood by those skilled in the art that a slip or graded multiple may be provided between the recorders and level 8 of the selectors in certain exchange installations.

It will be assumed that station 1111 has been assigned the designation of party one (for toll ticketing identification purposes) on line 1234; station 1110 has been designated at party two on line 1234; station 0111 has been designated as party one on line 2317; and station 0110 has been designated as party two on line 2317. In such arrangement the subscriber originating the call from station 1111 would dial party digit "1" immediately after the toll ticketing access code "8." It is apparent that the subscriber calling from station 1110 would dial party digit "2," etc.

It will be apparent that the digits of the four-digit station numbers in the terminal per station arrangement do not directly indicate the party on the line, but that the combination of the four digits indicate the specific station on a specific line in the system which can be assigned arbitrarily a specific party digit for calling identification purposes. This arbitrary party designation does not necessarily coincide with ringing assignments.

As the calling party identification digit "1" is now received over the calling loop by the register-sender 104, the digit is stored in the party digit register 260 therein.

As the impulses representative of the three-digit called office code are pulsed over the calling loop to the register-sender 104, the digits are stored in the office code registers 253 of the register-sender 104, and as the impulses representing the four digit called station number are pulsed over the calling loop to register-sender 104, such information is stored in the station registers 257 of the register-sender 104.

As soon as the three called office code digits and the first digit of the called station number are stored in the assigned registers, the register-sender 104 seizes the common translator 110 which deletes any unnecessary digits in the registers and supplies to the route registers 261 in the register sender the routing digits which are required to extend the connection to the desired exchange. As more fully described in the copending application, certain of the office code digits stored in the register 253 may not be required in extending the call to the desired exchange, and in such event the translator deletes same from the registers, and stores such additional routing digits as may be required. At this time the translator is released, and the register-sender 104 transmits in sequence the digits in the respective registers 261, 253, 257, even though the calling subscriber may be in the process of dialing the remaining station digits. As the sender clears the registers to the point reached by the subscriber, the sender waits for the next digit and transmits same as received. As each digit is transmitted, the register is cleared. When all but the last of the called station digits have been transmitted by the register-sender 104, all operated relays of the group 225, 230, etc., apply negative battery through ballast lamps and rectifiers to their respective terminals A. The common identifier 107, party control 109 and tone circuit 108 are seized by the register-sender 104, the tone circuit and identifier circuit being reached via a guard circuit 270 and the identifier being reached via conductor C.

With the seizure of the party control circuit 109, the register-sender 104 connects the party register 260 (in which the party identification digit "1" dialed by the calling subscriber has been registered) over cable 232 to the party control circuit 109. Upon seizure, all party control relays 225, 230, etc., in circuit 109 operate except the one corresponding to the particular party digit dialed (in this assumed case relay 225 for party digit "1" which was stored in register-sender 104). The first party relay 225 which did not operate is effective at its contacts 226 to connect the control terminals A for such parties through rectifiers to direct ground.

Register-sender 104 through a guard circuit 270 simultaneously seizes tone circuit 108, and controls a tone generator 248 therein to transmit a tone signal over the existing P-wire connections and the identifier circuit 107 to the detector 247 in tone circuit 108 for identification purposes. Thus in the present example, tone will be extended by the tone generator 248 in tone circuit 108 over guard circuit 270, register-sender 104, the P-wire of the seized recorder 103 and the P-wire connection extending back over the seized one of the line finder-selector links in the switching equipment 102, the P-wire of the calling line 1234 and the cross connect jumpers to the connector P-wire terminals of stations 1111 and 1110.

With reference first to the P-wire connector terminal for station 1110, it is apparent that a circuit is extended over input terminal 209 for the resistor identification network 208 individual to station 1110 and resistor 210 therein to the two branch paths comprised of (a) resistors 211–214 extending to the marking leads TH1–U0, and (b) the control circuit extending over control "A" terminal 215 to the party control circuit 109. As noted hereinbefore, station 1110 has been designated as party "2," and since the present call has been initiated by the subscriber at station 1111 (who has identified himself as the party "1"), the first party relay 225 is in the restored condition and the second party relay 230 is operated.

A circuit therefore extends from the tone generator 248 over the P-wires of the seized switches as described to the P-wire terminal of station 1110 and input terminal 209, resistor 210, control terminal 215, rectifier 224A, contacts 229 and ballast lamp 266 to battery, and the resulting current flow causes the rectifier to conduct and shunt the tone sufficiently to prevent the appearance of tone on the marking conductors connected to the resistors 211–214 of the resistor identification network 208 for station 1110.

With reference now to the P-wire terminal for station 1111 (party "1" and the calling subscriber in the present example) and the network 200 associated therewith, it will be apparent that the tone applied over the P-wire connector terminal of station 1111, the input terminal 201 and resistor 202 will not be shunted by the circuit extending over control terminal 207, and accordingly tone will be applied over the resistors 203–206 to the marking leads connected thereto. That is, since party relay 225 (party "1" relay) is in the restored position by reason of the information supplied by the calling subscriber to the party register 260 in register-sender 104 and thence to the party control circuit, direct ground will be applied over contacts 226 to the control circuit for the network 200. With ground connected to the right side of rectifier 224C, and the opposite side of the rectifier connected to the voltage divider in network 200 at a point more negative, no current will flow through the rectifier, and the tone will pass over resistors 203–206 to marking leads TH1, H1, T1, and U1, respectively.

With the seizure of the identifier 107 by the register-sender 104, the survey circuit 250 operates to scan the marking leads TC–U0 for tone on the different conductors. In that it has been assumed that the present call was initiated by the subscriber at station 1111, there will be an absence of tone on the common trunk conductor TC, and the survey circuit accordingly effects the transmission of local office code digits over cross connect circuit 251 and cable 252 to the office register 253 in register sender 104. The identifier 107 simultaneously controls the survey circuit to bypass the trunk conductors T1–T0 and to examine the lead TH1–U0 for the purpose of determining the identity of the calling one of the local subscribers. As the survey circuit advances to the first thousandths conductor TH1, the tone which is applied thereto over resistor 203 is resistor identification network 200 for station 1111 is extended over the survey circuit conductor 246 and tone detector 247 to battery.

Tone circuit 108 responsively transmits a signal over conductor 271 indicating that tone has been found, and the survey circuit 250 thereupon transmits a signal over cable 256 to the station registers 257 in register-sender 104 to effect registration of the thousands digit 1 in the first register of the group 257. The register-sender 104 in response to the registration of the first station digit transmits the last called digit to the tape punch 105 and initiates transmission of the calling office and station digits to the tape punch 105.

The survey circuit 250 advances in its scan over the remaining thousands marking leads TH2–TH0 (which will not have tone on them in the present example), and thereafter to the hundreds marking leads H1–H0. As indicated above tone over resistor 204 of resistance identification network 200 will appear on hundreds marking lead H1, and as a result of the detection of such tone by the survey circuit 250 and detector 247, the tone circuit 108 signals the identifier 107 over conductor 271 that tone has been found on hundreds marking lead H1. The survey circuit 250 thereupon transmits the hundreds digit "1" over cable 256 to the second register of the station register 257 of register-sender 104.

The survey circuit 250 scans the remaining marking leads in the hundreds, tens and units groups in like manner, and effects the registration of the tens and units digits as determined to the third and fourth station registers respectively in the group of registers 257 in register-sender 104. As the identifier 107 completes its scan in this manner, associated equipment therein effects the restoration of the identifier 107, the party control 109 and tone circuit 108.

During this period the register-sender 104 has been sending the calling office and station digits to tape punch 105 for recording thereon and continues in such operation until each of the digits has been thus recorded. Thereafter the register-sender 104 releases.

It is apparent from the foregoing description that if the second station 1110 on the party line 1234 had initiated the call and the party had properly identified himself by the transmission of the party digit "2," the second party relay 230 in party control circuit 109 would not have operated instead of the first party relay 225, and tone would have been extended from the line P-wire terminal 1234 over connector terminal 1110 and the resistor members of the associated resistor identification network 208 to marking leads TH1, H1, T1 and U0, respectively. The identifier 107 in its operation would detect the presence of tone on such leads and effect the registration of the identification number 1110 on the station registers 257 of the register-sender 104.

The manner in which the identification equipment is operative with the establishment of calls by subscribers at stations 0111, 0110, on line 2317, etc., is believed to be readily apparent from the foregoing disclosure.

EXTENSION OF A CALL FROM A NON-RECORDER OFFICE TO A SUBSCRIBER IN A RECORDER OFFICE OR THROUGH A RECORDER OFFICE TO A SUBSCRIBER IN A DISTANT OFFICE

Assuming for purposes of illustration that a call is incoming from the non-recorder office, such as office B over trunk line 125C of trunk 117C in trunk group 0 in the recorder office A, the calling connection will be extended into the associated trunk selector of the switching equipment 102. Assuming the selector to be of the cut-through type, the connection is extended into an idle one of the recorders, such as illustrated recorder 103, which responsively seizes associated register-sender 104.

The party digit then dialed by the subscriber is extended over the + and − leads of the trunk 117C, the associated selector, and the recorder 103 to the party digit register 260 in the register-sender 104.

The calling subscriber now dials the called office code and the digits of the called subscriber's station number which are stored in the appropriate ones of the registers in register-sender 104 and are simultaneously recorded on the tape by tape punch 105. Register-sender 104 seizes translator 110 after the first four digits dialed have been received.

The translator 110 stores the necessary routing digits in route registers 261 of the register-sender 104 and restores. The sender portion of register-sender 104 thereupon transmits the called information found in the registers with the exception of the last digit of the called subscriber station number. At this time the register-sender 104 at the recorder office A seizes the common identifier 107, the party control circuit 109, and the tone circuit 108, the identifier and tone circuits being seized via guard circuit 270.

With the seizure of the tone circuit 108 and identifier circuit 107, tone generator 248 sends tone over the guard circuit and register-sender 104 to the P-wire of the recorder 103 and the P-wire of the connection extending over the selector to incoming trunk 117C and the resistor identification network 243 associated therewith. Such tone thereupon is extended over the first resistor 244 to the common trunk lead TC and the second resistor 245 to the trunk marking lead T0 for trunk group 0.

It was noted previously that the identifier 107 in scanning the terminals, initially tests the common trunk conductor TC to determine whether the connection has been established over an incoming trunk. In the present example, the trunk detects the tone on conductor TC and advances over each of the trunk marking leads T1–T0 in search of identification tone for the trunk in use.

As the detector advances to the marking lead T0, the tone placed thereon over resistor 245 in network 243 will indicate to the identifier that the calling trunk is in the "0" trunk group, and the identifier 107 transmits the calling office code digits over cross connect circuit 251 and cable 252 to the group of office register 253 in register-sender 104.

At this time the line identifier transmits a signal to the seized trunk 117C which in turn relays such signal to the distant trunk circuit to control same to engage the distant identifier 119, line resistor network and cross-connect circuit 122 and tone circuit 120 (see FIGURE 1).

The distant identifier 119 scans the line resistor network and cross-connect 122 to determine the calling directory number and relays same in impulse form over the connection to the recorder office register-sender 104 for storage in the registers thereat in the manner previously described.

The manner in which the equipment proceeds thereafter will be apparent from the foregoing disclosure.

TERMINAL-PER-LINE ARRANGEMENTS

The identification procedure and connections are altered in the systems which have the subscriber lines connected according to a terminal-per-line pattern. That is, as noted in detail heretofore, the line entrance originating designation for the line in such system is the same as the connector terminal designation for the line, and different party digits are dialed for the purpose of ringing different parties on the line. With specific reference to FIGURE 3 there is shown therein the connections of two stations 11111 and 11112 to the party line 1111. As will be apparent with consideration of FIGURE 3, the P-wire for a party line is connected common to a single connector terminal, such as illustrated terminal 1111, whereas in FIGURE 2 the P-wire of a party line is connected to various connector P-wire terminals associated with called parties on the line.

More specifically, the first four digits in the terminal-per-line arrangement shown identify the number of the subscriber line and the fifth digit designates the party on such line. It is apparent therefore that the line entrance originating designation 1111 is the same as the connector terminal designation for such line. The last or party digit when dialed into a connector enables the connector to select the proper ringing frequency corresponding to the called party on the line. The same party digit is used for toll ticketing purposes and in such arrangement the party digit is dialed directly into the party register 260 of the register-sender 104. The operation of the system is similar in some respects to that set forth hereinbefore. In the terminal-per-line arrangement, however, the survey circuit 250 of the identifier 107 in its scan across the terminals will effect the same registration for a calling subscirber line, such as line 1111, regardless of the particular station such as 11111 or 11112 which originates the call. These identification digits are stored in the station registers 257 in the manner of the previously described connections. It should be recalled that there is a resistor network for each connector terminal in both the terminal-per-line and the terminal-per-station systems. As a line in a terminal-per-line arrangement appears on only one connector terminal rather than on several connector terminals as in the terminal-per-station arrangement, tone projected back over originating connections will reach only the one resistor network and therefore a party control circuit for discriminating between resistor networks is not necessary as it is in the terminal-per-station arrangement.

Additionally, the identifier 107 sends a signal over conductor K to the register-sender 104 to indicate that the party digit stored in party register 261 is to be punched on the tape following the punching of the calling line number.

Referring now to a call originating at the non-recorder office, if that office is of the terminal-per-line type, the trunk 116 will not contain a party register, no party control circuit will be equipped, and the identifier 119 and resistor network 122 will be of kind shown in FIGURE 3 for local line identification.

When a calling subscriber in the non-recorder office dials his calling party digit it is stored only in the party register 260 in register-sender 104 at the recorder office.

As in the terminal-per-station arrangement, the survey circuit 250 scans lead TC to determine whether the call originated over a trunk. If so, it scans the leads T1-T0 to determine the trunk group by means of the cross-connect and stores the calling office code in the group of registers 253. Thereupon, the identifier sends a signal over the trunk to the non-recorder office, marking trunk circuit 116 to engage the common identifier 119 and tone circuit 120.

Thereupon the identifier scans to determine the digits of the calling line number and pulses the same over the trunk into the registers 257 of the register-sender 104 at the recorder office.

The sender part of the register-sender 104 pulses into the tape punch the calling office digits found in registers 253, the digits of the line number found in registers 257, and finally the party digit found in party register 260.

SYSTEMS ARRANGEMENTS

It should be observed that the recorder office may be of either terminal-per-line or terminal-per-station type and that it may serve several non-recorder offices, each of which may be of either terminal-per-line or terminal-per-station type. Any terminal-per-station non-recorder office will have local identification equipment similar to the local identification equipment of FIGURE 2; and any terminal-per-line non-recorder office will have local identification equipment similar to the local identification equipment of FIGURE 3.

When the associated recorder office receives a call from a non-recorder office, it ascertains via the trunk identification equipment the non-recorder office at which the call originated, and by means of the cross-connect knows whether that office is connected in a terminal-per-line or terminal-per-station pattern. If the originating office is connected according to a terminal-per-line pattern, the cross-connect gives a signal over lead K to register-sender 104, to indicate that the digit stored in party digit register 260 is to be punched on the tape. If the originating office is connected according to a terminal-per-station pattern, the cross-connect does not give this signal over lead K, and accordingly the digit stored in register 260 is not punched on the tape.

SPECIFIC CONSIDERATIONS

For purposes of space and economy, the resistors, such as 202, 203, etc., for twenty connector terminals are located on a printed circuit card about 8" high by 4" wide. Cards are stacked like books on a shelf, twenty-five cards (500 lines or 500 stations) occupying the width of a 19" frame. Terminals along the front edges of the cards are connected to the test wires (P-wires) of the lines, and the terminals on the back edges are connected to a bare wire multiple forming the identification leads.

Since high resistance values are used, the tone voltage should be high in order to deliver an adequate signal to the detector. The high test wire impedence seen by the tone generator permits it to deliver high voltage without excessive power requirement.

With high tone voltage, the frequency either should be low to minimize induction into voice circuits, or should be above the voice range so that induction would be inaudible. A high frequency is not desirable, however, because the high impedance from test wire to ground on idle lines would permit considerable induction into other test wires through switchboard cable capacity, inviting the possibility of false detector response.

A tone frequency of 200 cycles has been chosen since it is low enough to avoid induction problems, but high enough to avoid certain drawbacks of very low frequencies, such as slower detector response and more awkward component values in the generator and detector.

The rectifiers for terminal-per-station offices consist of ¼" diameter selenium discs stacked in a Bakelite tube with terminals projecting from a slot in the side of the tube. A tube about 5" long holds 20 rectifiers. The rectifier tubes are mounted below the resistor cards, with jumpers running from terminals on the front edges of the cards to the terminals on the rectifiers.

While certain preferred embodiments of the invention have been shown and described herein, it is apparent that modifications and alterations may be made which include the basic concepts of the invention, and it is intended in the appended claims to cover all such modifications and alterations as may fall within the true spirit and scope of the invention.

What is claimed is:

1. In an automatic telephone system having switching means for establishing connections between subscriber lines in the exchanges in the system, and ticketing equipment for making a record of at least certain of said connections; a common marking means including a plurality of marking members, each of which is operative as energized to represent a predetermined value of a digit of a calling subscriber directory number, a plurality of identification marking means, each of which is connected to represent a subscriber directory number, each of said identification marking means including a plurality of identification elements connected to the ones of said marking members in said common marking means which correspond to the digits of the directory number assigned to its associated subscriber line, signal means operative responsive to the establishment of certain connections over said switching means by calling subscriber to apply signals over the established connection to the identification marking means for the calling line and the ones of the common marking members connected thereto, and a common detector means operative in each line identification cycle to scan each of said marking members according to a predetermined pattern and to provide signals indicating the ones of the conductors having said marking signals thereon.

2. In an automatic telephone system having switching means for establishing connections between subscriber lines in the exchanges of the system, and ticketing equipment for making a record of at least certain of said connections; a common marking means including a plurality of marking members, each of which is operative as energized to represent a predetermined value of a digit of the directory number of a calling subscriber, an identification marking means for each subscriber line comprising a plurality of resistor members, each of which resistor members of an identification marking means for a line is connected between its associated line and the ones of the common marking members which correspond to the digits of the directory number assigned to its associated line, signal means connected for use by said ticketing means responsive to the establishment of a connection over said switching means in the direction of a desired subscriber to apply signals back over the established connection and the calling line to the resistor members of the marking means for the calling line and the ones of the common marking members connected thereto, and a common circuit detector means including a common detector and survey means operative in each identification of a line to connect each of said marking members at different intervals to said detector circuit according to a predetermined pattern to determine the ones of the marking members which have said marking signals thereon.

3. In an automatic telephone system having switching means for establishing connections between subscriber lines in the exchanges of the system, and ticketing equipment for making a record of at least certain of said connections; a common marking means including a plurality of marking members, each of which is operative when energized to represent a predetermined digit, an identification marking means for each subscriber line, the marking means for a line comprising a plurality of resistor members connected between its associated line and the different ones of the marking members in the common marking means which correspond to the digits of the directory number of its associated line, signal means operative responsive to the establishment of a connection including the test conductor of certain of said switching means to apply signals over said test conductor to the resistor members for the calling line and the ones of the common marking members connected thereto, and a common detector means including a common detector circuit, and survey means operative in each identification of a line to connect each of said marking members at different intervals to said detector circuit according to a predetermined sequence to determine the ones of the marking members having said marking signals thereon.

4. In an automatic telephone system having switching means for establishing connections between subscriber lines in the exchanges of a system, and ticketing equipment for making a record of at least certain of said connections; a common marking means including a plurality of marking members, each of which is operative as energized to represent a predetermined digit, an identification marking means for each subscriber line, each marking means comprising a plurality of members connected to the ones of said common marking members which correspond to the digits of the directory number assigned to its associated subscriber line, signal means operative responsive to the establishment of certain connections over said switching means in the direction of a desired subscriber line to apply signals over the established connection to the identification marking means for the calling line and the ones of the common marking members connected thereto, a common detector means including a common detector circuit, and survey means operative in each identification of a line to connect each of said common marking members at different intervals to said detector circuit according to a predetermined pattern to determine the ones of the marking members having said marking signals thereon, including means for transmitting the markings determined by said detector means to said ticketing equipment, and register means in said ticketing equipment for registering a preassigned identification party digit as dialed by the calling subscriber and the directory number of the lines as received from said detector means.

5. In an automatic telephone system having switching means for establishing connections between subscriber lines in the exchanges of a system, and ticketing equipment for making a record of at least certain of said connections and in which a party line calling subscriber transmits an identification digit in the establishment of said certain connections; a common marking means including a plurality of marking members, each of which is operative as energized to represent a predetermined digit, an identification marking means for each subscriber on a line, each of which comprises an individual set of marking devices, the marking devices for each of the different subscribers being connected between the subscriber line and the ones of said marking members in the common marking means which correspond to the digits of the directory number assigned to its associated subscriber, signal means operative responsive to the establishment of certain connections over said switching means to apply signals over said connection and the calling line to the marking devices and the marking members connected thereto, discriminator means operatively controlled by the identification digit transmitted by the calling party for rendering ineffective the identification marking means for subscribers on the calling line other than the calling subscriber and for enabling the identification marking means for the calling subscriber, and detector means operative to scan said marking members according to a predetermined pattern to determine the ones of the marking members having said marking signals thereon.

6. In an automatic telephone system having switching means for establishing connections between subscriber lines in the exchanges of a system, certain of said lines having more than one subscriber connected thereto, and ticketing equipment for making a record of at least certain of said connections; a common marking means including a plurality of marking members, each of which is operative as energized to represent a predetermined digit, an identification marking means for each subscriber station on a line, each of which comprises a plurality of marking devices, the devices of the identification marking means for each of the different subscriber stations being connected between its associated line and the ones of said marking members which correspond to the digits of the directory number assigned to the associated subscriber station, signal means operative responsive to the establishment of certaiin connections over said switching means to apply signals back over the established connection to the calling line to the interconnected ones of the common marking members, detector means operative to scan each of said marking members according to a predetermined pattern to determine the ones of the marking members which have said marking signals thereon, and discriminator means for rendering effective only the marking means associated with the calling subscriber of the different subscribers on a line comprising party control means operatively controlled to enable only the identification marking means for the subscriber on the line indicated by the numerical value of the party digit dialed by the calling subscriber.

7. In an automatic telephone system having a plurality of exchanges, switching means for establishing connections between subscriber lines in the exchanges, and ticketing equipment for making a record of at least certain of said connections; certain of said lines having a plurality of subscribers connected thereto, each subscriber on a line having a different party digit preassigned thereto for transmission by the subscriber for identification purposes in the establishment of at least said certain connections, an identification matrix including a unique input point to said matrix for each station in each multi-party line, and a common marking means for marking the digits of the directory number of each calling subscriber, identification marking means for each subscriber on a line, each of which is connected between its associated line and said marking means to identify each of said subscribers thereto, means operative responsive to the establishment of certain connections over said switching means to apply signals over the identification marking means connected to the calling line to the common marking means, and discrimination means operatively controlled by the party digit dialled by the calling subscriber to enable only the identification marking means for the calling one of the subscribers on the line.

8. In an automatic telephone system as set forth in claim 7 in which said means for applying signals to said identification marking means comprises a tone generator for coupling alternating current signals over the calling line and the identification marking means for such line to the common marking means, and which includes a tone detector, and means for connecting said tone detector to said common marking means in a given sequence to determine the ones of the common marking means which are marked with said tone and thereby the subscriber directory number marked thereon.

9. In an automatic telephone system having a plurality of exchanges, switching means for establishing connections between subscriber lines in the exchanges, and ticketing equipment for making a record of at least certain of said connections; certain of said lines having a plurality of subscribers connected thereto, each subscriber on a line having a different party digit preassigned thereto for transmission by the subscriber for identification purposes in the establishment of at least said certain connections, common marking means for marking the digits of the directory number of a calling subscriber, identification marking means for each subscriber station on a line connected between said line and said marking means to identify each of said subscribers thereto, means operative responsive to the establishment of certain connections over said switching means to apply marking signals over the identification marking means for the calling line, and discrimination means operatively controlled by the dialing of said party digit by the calling subscriber to enable only the identification marking means for the calling one of the subscribers on the line, including a plurality of party control means, each party control means being connected to represent a different predetermined party digit, a shunt means for each identification marking means for each party on a line for shunting the marking signals applied to the line relative to its associated identification means, and means for controlling the ones of the party control means other than the party control means indicated by the value of the party digit transmitted by the calling subscriber to enable the shunt circuit for the identification marking means of the other parties on the line.

10. In an automatic telephone system as set forth in claim 9 which includes means for connecting each of said party control means in common for the subscribers on the different lines which have the position on the line represented by the corresponding party control means.

11. In an automatic telephone system as set forth in claim 9 which includes means for connecting each of said party control means in common for the subscribers on the different lines which have similar positions on the different lines, and in which said ticketing equipment includes register means having means for registering the identifying party digit as received from the calling subscriber, and means for effecting operation of the party control means other than the one of the party control means indicated by the value of the registered digit in response to the transmission of a predetermined number of the digits of the called number from said register means.

12. In an automatic telephone system having a plurality of exchanges, switching means including a plurality of groups of trunk circuits for establishing connections between subscriber lines in a plurality of exchanges, and ticketing equipment for making a record of at least certain of said connections; common marking means including a first marking means for marking the call as including a trunk circuit in the originating connection, and a second marking means for marking the assigned group of the calling trunk, identification marking means connected from each trunk to said first and second marking means, means operative responsive to the establishment of a connection over said switching means in the direction of a desired subscriber to apply signals over said connection and the calling trunk to the identification marking means for the calling trunk and the ones of the common marking members connected thereto including said first marking means, and detector means operative to first scan said first means to detect a marking indicating the connection is extended over a trunk circuit, and means operative only responsive to detection of such condition to control said detector means to scan said second means to determine the group indicated thereon.

13. In a telephone system, a multiparty line connected to a line circuit having a control lead, each station on said multiparty line adapted to originate calls, a signal voltage, a matrix having a unique input point for each station on said line, means for applying said signal voltage to said control lead responsive to any one of said stations originating a call, and means for selectively transmitting said signal voltage to the matrix input point corresponding to the station originating the call whereby said station may be identified.

14. In a telephone system, a multiparty line connected to a line circuit having a control lead, each station on said multiparty line adapted to originate calls, a signal voltage, a matrix having a unique input terminal for each station on said line, means for registering information indicative of the station on said line originating a call, means for applying said signal voltage to said control lead responsive to any one of said stations originating a call, and means controlled in accordance with said registered information for selectively transmitting said signal voltage to the matrix input terminal corresponding to the station originating a call whereby said station may be identified.

15. In a telephone system, a multiparty line connected to a line circuit having a control lead, each station on said multiparty line adapted to originate calls, an electrical signal, a matrix having a unique input point for a unique identification means for each station on said line, means for applying said electrical signal to said control lead responsive to any one of said stations originating a call, and means for selectively transmitting said electrical signal on the control lead over only the unique identification means which corresponds to the station originating the call, whereby said station may be identified.

16. In a telephone system, a multiparty line connected to a line having a control lead, each station on said multiparty line adapted to originate calls, an electrical signal, a matrix having a unique input terminal for a unique identification means for each station on said line, means for registering information indicative of the station on said line originating a call, means for applying said electrical signal to said control lead responsive to any one of said stations originating a call, and means controlled in accordance with said registered information for selectively transmitting said electrical signal over only the unique identification means corresponding to the station originating a call and its unique terminal, whereby said station may be identified.

17. In a telephone system, a multiparty line connected to a line circuit having a control lead, each station on said multiparty line adapted to originate calls, a matrix having a unique input terminal and an associated unique identification means for each station on said line, a two terminal device individual to each station on said line, means for connecting the first terminal of each of said devices to said control lead, means for individually connecting the second terminals of said devices to individual ones of said matrix input terminals, an electrical signal, enabling means for each station connected to the second terminal of the device and the matrix input terminal for the station, and means responsive to any one of said stations originating a call for selectively controlling the enabling means for the calling station to complete a path for the electrical signal which extends from said control lead over the two terminal device individual to the calling station, the matrix input terminal corresponding to said calling station and only the unique identification means for said calling station so that an identification may be made of said station.

18. In a telephone system, a multiparty line connected to a line circuit having a control lead, each station on said multiparty line adapted to originate calls, an electrical signal, a matrix having a unique input terminal for unique identification means for each station on said line, a two terminal electrical device individual to each station on said line, each device interposed in a connection between its individually associated matrix input terminal and the control lead, means for applying said electrical signal to said control lead in response to any one of said stations on said line originating a call, and circuit means for each device effective in one condition to establish current flow from the control lead over the associated matrix input terminal and its identification means, and effective in a second condition to prevent current flow over its associated identification means; and means for placing said circuit means in said first condition whenever its associated station originates a call whereby said electrical signal may be selectively conducted over only the unique identification means corresponding to said calling station.

19. In a telephone system, a multiparty line connected to a line circuit having a control lead, each station of said multiparty line adapted to originate calls, an electrical signal, a matrix having a unique input terminal for a unique identification means for each station on said line, a two terminal electrical device individual to each station on said line, each device interposed in a connection between its individually associated matrix input terminal and the control lead, enabling means for each device having a first condition which is effective to prevent current flow from the control lead over its associated identification means, and a second condition which permits current flow from the control lead over the device, its associated matrix input terminal and its associated identification means, said second condition being obtained in response to the conjoint application of said signal voltage to said control lead and operation of the associated enabling means to said second condition, means for registering information indicative of the station on said line originating a call, and means controlled in accordance with said registered information for operating said enabling means individual to said originating station to said second condition, whereby said signal voltage may be conducted over the device individual to the matrix input terminal corresponding to said calling station and over only the unique identification means for the station, so that an identification may be made of said station.

20. In a telephone system, a multiparty line connected to a line circuit having a control lead, each station on said multiparty line adapted to originate calls, an electrical signal, a matrix having common marking means, and a unique input point for a unique identification means for each station on said line, means for applying said electrical signal to said control lead responsive to any one of said stations originating a call, enabling means for each of the identification means for said stations connected to the corresponding ones of the matrix input points, and means for selectively controlling the enabling means to effect the transmission of said electrical signal on the control lead over only the identification means corresponding to the station originating the call, whereby said station may be identified on said common marking means, and to prevent said electrical signal from transmission over the other identification circuits associated with said line to said common marking means.

21. In a telephone system, a multiparty line connected to a line circuit having a control lead, each station on said multiparty line adapted to originate calls, an electrical signal, a single matrix including a common set of marking means for marking each digit of the directory number of each of said calling stations, a unique input point to said matrix for each station on said line, unique identification means for each station coupled to the matrix input point for the station and to the ones of said common marking means which identify the digits in the directory number of said calling station, means for applying said electrical signal to said control lead responsive to any one of said stations originating a call, enabling means for each of the identification means for said stations on said line, and means for selectively controlling the enabling means to effect the transmission of said electrical signal on the control lead over only the unique identification means for the station originating the call to mark the common marking means which are coupled thereto.

22. In a telephone system, a multiparty line connected to a line circuit having a control lead, each station on said multiparty line adapted to originate calls, a single identification matrix including a unique input point to said matrix for each station on said line and a common marking means for marking the digits of the directory number of each of said calling stations, each digit having an order in said number and a decimal value within said order, said matrix including different common marking means for each digit in each order, unique identification means for each station on said line electrically coupled to the plurality of common marking means which represent the orders and decimal values of the digits in its directory number, the identification means for different directory numbers being coupled to the same common marking means for each of the digits thereof having the same value in the same order, an electrical signal, means responsive to any one of said stations on said line originating a call for controlling the transmission of said electrical signal over said control lead, and enabling means selectively operative to control transmission of said electrical signal on the control lead over only the identification means for the calling station to the common marking means coupled thereto.

No references cited.

ROBERT H. ROSE, *Primary Examiner.*

UNITED STATES PATENT OFFICE

CERTIFICATE OF CORRECTION

Patent No. 3,188,395 June 8, 1965

William H. Blashfield

It is hereby certified that error appears in the above numbered patent requiring correction and that the said Letters Patent should read as corrected below.

Column 20, line 31, after "call," insert -- means for applying said signal to said control lead in response to any one of said stations originating a call, --.

Signed and sealed this 7th day of December 1965.

(SEAL)
Attest:

ERNEST W. SWIDER
Attesting Officer

EDWARD J. BRENNER
Commissioner of Patents